(12) United States Patent
Quigley

(10) Patent No.: US 7,278,514 B1
(45) Date of Patent: Oct. 9, 2007

(54) ACOUSTIC NOISE FILTER

(75) Inventor: James M. Quigley, Philadelphia, PA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 375 days.

(21) Appl. No.: 10/693,849

(22) Filed: Oct. 17, 2003

(51) Int. Cl.
- *F01N 1/22* (2006.01)
- *F01N 1/24* (2006.01)
- *F16L 55/027* (2006.01)
- *F16L 55/04* (2006.01)

(52) U.S. Cl. .............. 181/256; 181/252; 181/222; 181/249; 181/255; 181/277; 181/278; 181/250; 181/273; 181/276; 181/212; 181/219; 181/227; 181/233; 181/248

(58) Field of Classification Search ............... 181/252, 181/256, 222, 249, 255, 277, 278, 250, 273, 181/276, 210, 214, 290, 292, 293, 212, 219, 181/227, 232, 233, 248; 244/1 N
See application file for complete search history.

(56) References Cited

U.S. PATENT DOCUMENTS

| | | | | |
|---|---|---|---|---|
| 2,495,693 A | * | 1/1950 | Wilbert et al. | 138/30 |
| 2,841,181 A | * | 7/1958 | Hewitt et al. | 138/30 |
| 2,875,787 A | * | 3/1959 | Evans | 138/30 |
| 2,943,695 A | * | 7/1960 | Jeffords | 181/243 |
| 3,063,470 A | * | 11/1962 | Forster | 138/30 |
| 3,473,565 A | * | 10/1969 | Blendermann | 137/593 |
| 3,966,015 A | * | 6/1976 | Bychinsky | 181/268 |
| 4,186,775 A | * | 2/1980 | Muroi | 138/30 |
| 4,314,621 A | * | 2/1982 | Hansen | 181/233 |
| 4,540,064 A | * | 9/1985 | Fujimura | 181/227 |
| 4,732,176 A | * | 3/1988 | Sugimura | 138/30 |
| 4,768,616 A | * | 9/1988 | Richard et al. | 181/233 |
| 5,183,974 A | * | 2/1993 | Wilhelm et al. | 181/0.5 |
| 5,398,407 A | * | 3/1995 | Stuer | 29/890 |
| 5,732,741 A | * | 3/1998 | Shiery | 138/30 |
| 5,860,452 A | * | 1/1999 | Ellis | 138/30 |
| 6,029,708 A | * | 2/2000 | Spell et al. | 138/30 |
| 6,446,454 B1 | * | 9/2002 | Lee et al. | 62/296 |
| 2001/0009207 A1 | * | 7/2001 | Faulhaber et al. | 181/224 |

FOREIGN PATENT DOCUMENTS

| | | | | |
|---|---|---|---|---|
| JP | | 63186907 A | * | 8/1988 |
| JP | | 04001409 A | * | 1/1992 |

* cited by examiner

*Primary Examiner*—Lincoln Donovan
*Assistant Examiner*—Jeremy Luks
(74) *Attorney, Agent, or Firm*—Jacob Shuster; Scott Boalick

(57) ABSTRACT

An acoustic filter is provided with a single flow chamber for exposure of a flexible rubber layer to liquid undergoing flow through the flow chamber with noise producing acoustic energy therein. The flexible rubber layer is supported on a cylindrical drum with slanted holes therein through which the exposure to the liquid in the flow chamber is effected. An axially sectioned drum with dimensionally different diameters, radial thicknesses and slanted holes therein is positioned over the rubber layer within an outer casing to establish a plurality of gas-filled cavities of different axial lengths and separated from each other along the axial length of the liquid flow chamber which is connected at its opposite axial ends by pipe sections to a piping system from which the liquid within the flow chamber is derived.

16 Claims, 3 Drawing Sheets

ACOUSTIC NOISE FILTER

The present invention relates to filtering out acoustic noise transmitted within fluid conducted through a piping system.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Acoustic filters are presently utilized in a variety of fluid filled systems, including those aboard U.S. Navy ships, to block, limit or reduce transmission of noise producing acoustic energy within a range of acoustic frequencies. Such filters are however not tunable for use with respect to specific acoustic frequencies. Currently absorptive types of filters are utilized to absorb acoustic energy, while reactive types of filters are utilized to reflect acoustic energy within a certain frequency range back toward its source in order to quiet the piping system downstream of the filter.

A rubber cylinder type of filter is also currently utilized, wherein liquid in a pipe is exposed to a single gas filled cavity. The rubber cylinder component of such a filter breaks up under acoustic frequencies higher than its breathing mode frequency to thereby reduce optimal performance. Such a filter cannot be tuned to a wide range of frequencies so as to adjust it to a specific desired frequency within the range. Such rubber cylinder filters furthermore require tube reinforcement to prevent the rubber cylinder from being sucked into the liquid under high flow conditions within the pipe, and require maintenance cleansing for removal of obstructive particles or silt involving removal of the filter from the pipe. Operational interference also occurs as a result of creepage of the rubber cylinder over time under the weight of the liquid in the pipe.

Another type of available filter involves use of an extension pipe section extending some distance from a main pipe to which it is connected. Such filters are only slightly effective in filtering and are often unsatisfactory in certain installations.

It is therefore an important object of the present invention to provide an acoustic filter which will avoid the aforementioned problems and disadvantages associated with the currently available acoustic filters.

SUMMARY OF THE INVENTION

In accordance with the present invention, a liquid flow chamber is enclosed within a radially inner cylindrical support drum on which a cylindrical rubber layer is positioned for exposure through slanted holes of different size in the support drum to the liquid in the flow chamber. A plurality of volumetrically small annular gas cavities of different axial lengths are formed over the rubber layer enclosed within an outer casing for exposure of the rubber layer to gas in opposition to its exposure to the liquid in the flow chamber through a plurality of slanted holes of different size in dimensionally different axial sections of a second cylindrical drum radially spaced by the rubber layer from the inner drum. The difference in size of the slanted holes and the differently sized gas cavities are such as to establish a range of selected acoustic frequencies covering reactive response to acoustic noise producing energy by deformation of the rubber layer within the filter. The arrangement of the inner and outer drums, the dimensionally sectioned outer drum with correspondingly different sized slanted holes therein not only accommodates high performance in filtering of acoustic energy at different frequencies, but also minimizes collection of particles or silt within the holes as well as to facilitate cleansing thereof.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
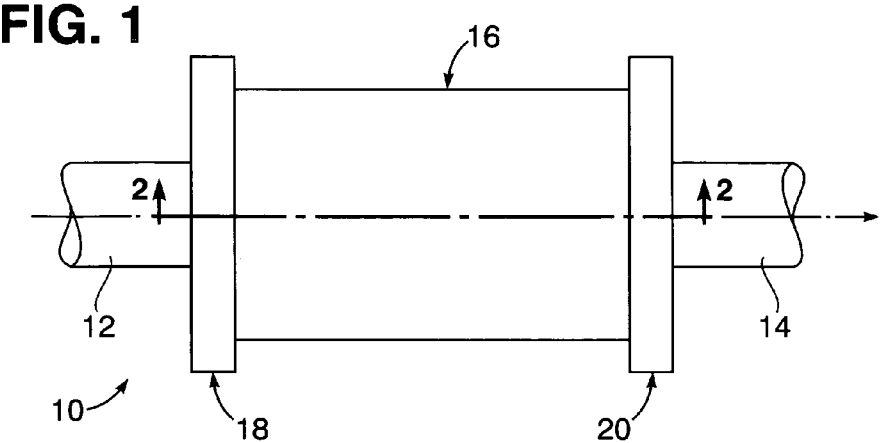
FIG. 1 is a side elevation view of an acoustic filter constructed in accordance with one embodiment of the present invention, to be installed within a piping system.

Referring now to the drawing in detail, FIG. 1 illustrates a reactive acoustic noise filter 10 constructed in accordance with one embodiment of the present invention, having inflow and outflow pipe sections 12 and 14 of a piping system extending from opposite axial ends of the filter 10. The piping system conducts fluid such as liquid which transmits acoustical energy as a source of noise transmitted within the liquid through the filter 10 so as to be reflected and thereby block emission of the noise pursuant to the present invention as hereinafter explained.

Figure 2:
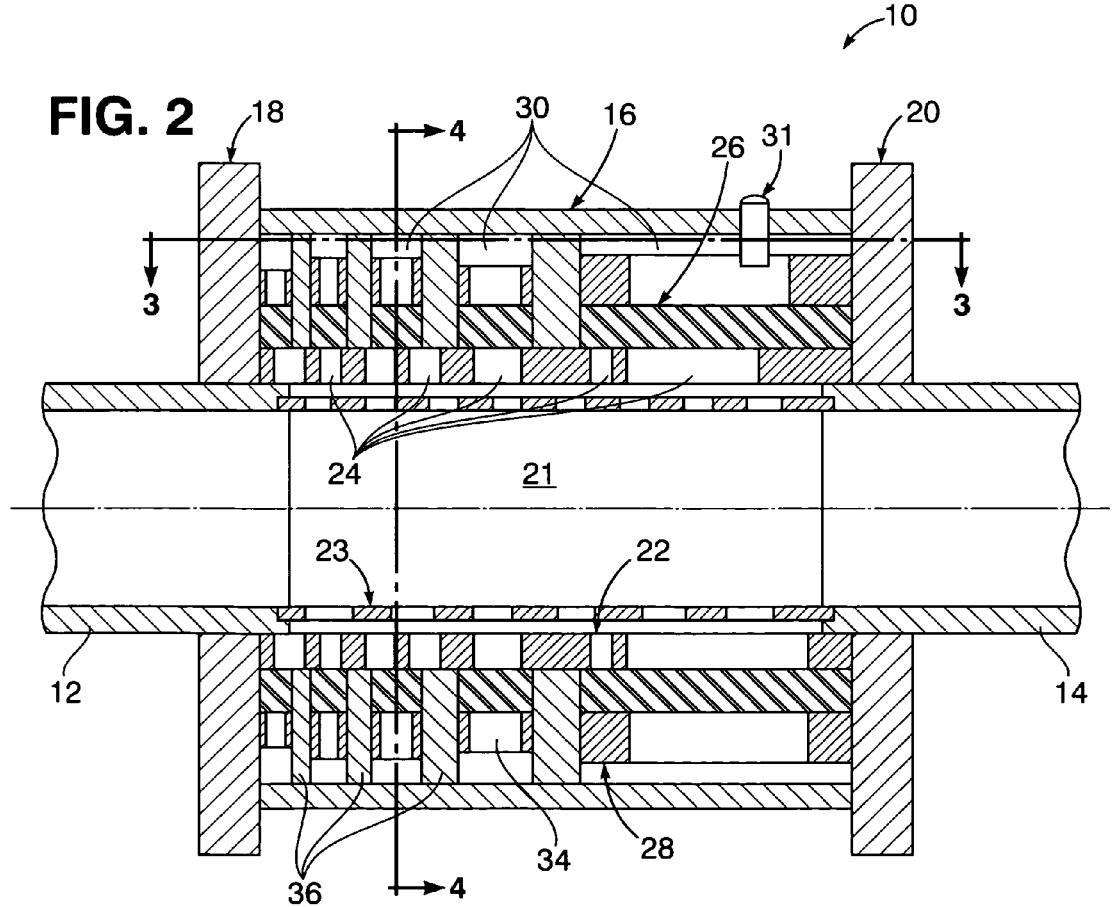
FIG. 2 is a side section view taken substantially through a plane indicated by section line 2-2 in FIG. 1.

The filter 10 as shown in FIGS. 1 and 2 has an outer cylindrical casing 16 connected to and extending axially between a pair of flanges 18 and 20 from which the pipe sections 12 and 14 respectively extend in axial alignment with each other. Enclosed and confined within the casing 16 is an inner flow chamber 21 through which the liquid is conducted between the pipe sections 12 and 14. Such flow chamber 21 is shown enclosed within an inner cylindrical support drum 22 extending axially between the pipe sections 12 and 14 about a cylindrical screen 23. The drum 22 is perforated by a plurality of holes 24 through which a cylindrical flexible rubber layer 26 is exposed to the liquid in the chamber 21. The cylindrical flexible rubber layer 26 is positioned over the inner drum 22 within an outer cylindrical support drum 28 radially spaced from the outer casing 16 so as to form gas cavities 30 therebetween exerting pressures on the rubber layer 26 in opposition to pressures exerted thereon in response to its exposure to the liquid in the chamber 21 through the holes 24. In order to equalize the pressure in the gas cavities 30 with that of the liquid in the chamber 21, a selectively controlled valve 31 may be mounted in the outer casing 16 as shown in FIG. 2.

Figure 3:
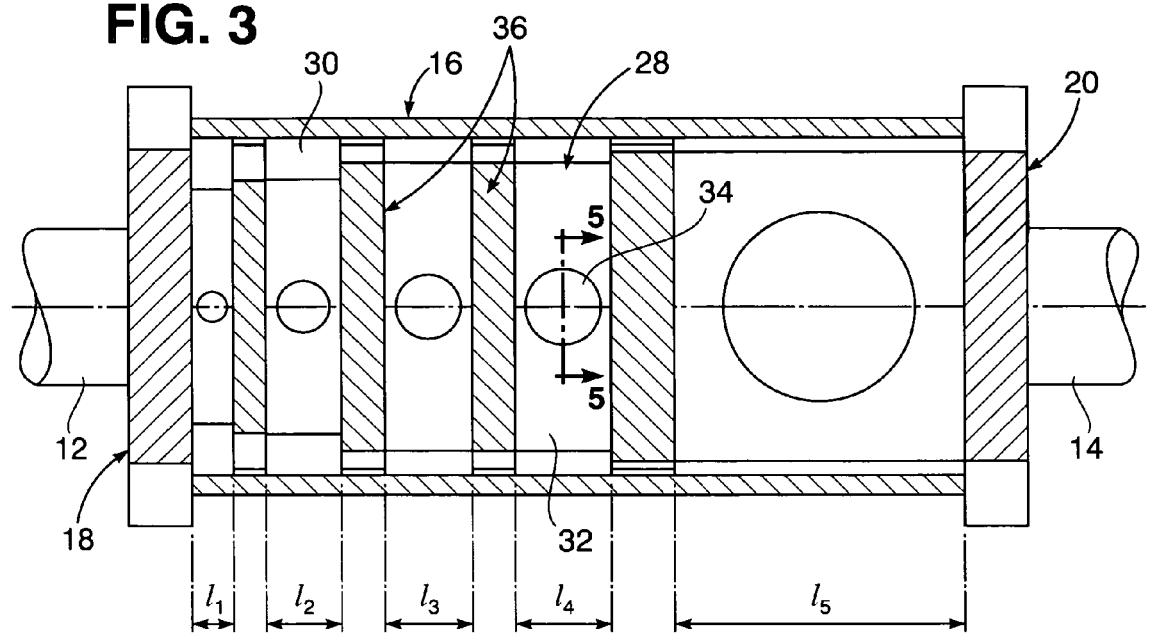
FIGS. 3 and 4 are section views taken substantially through planes indicated by section lines 3-3 and 4-4 in FIG. 2.
Figure 4:
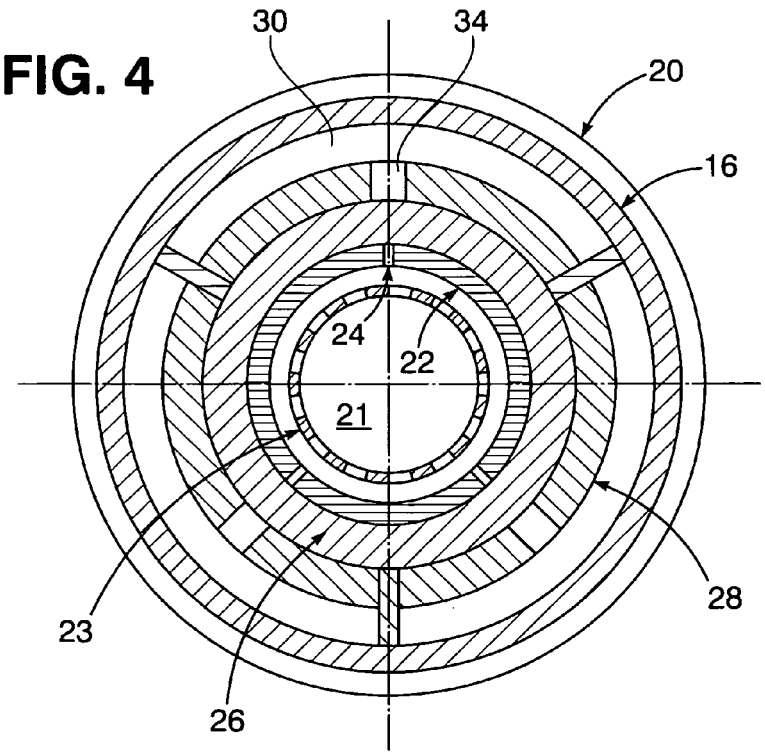
Figure 5:
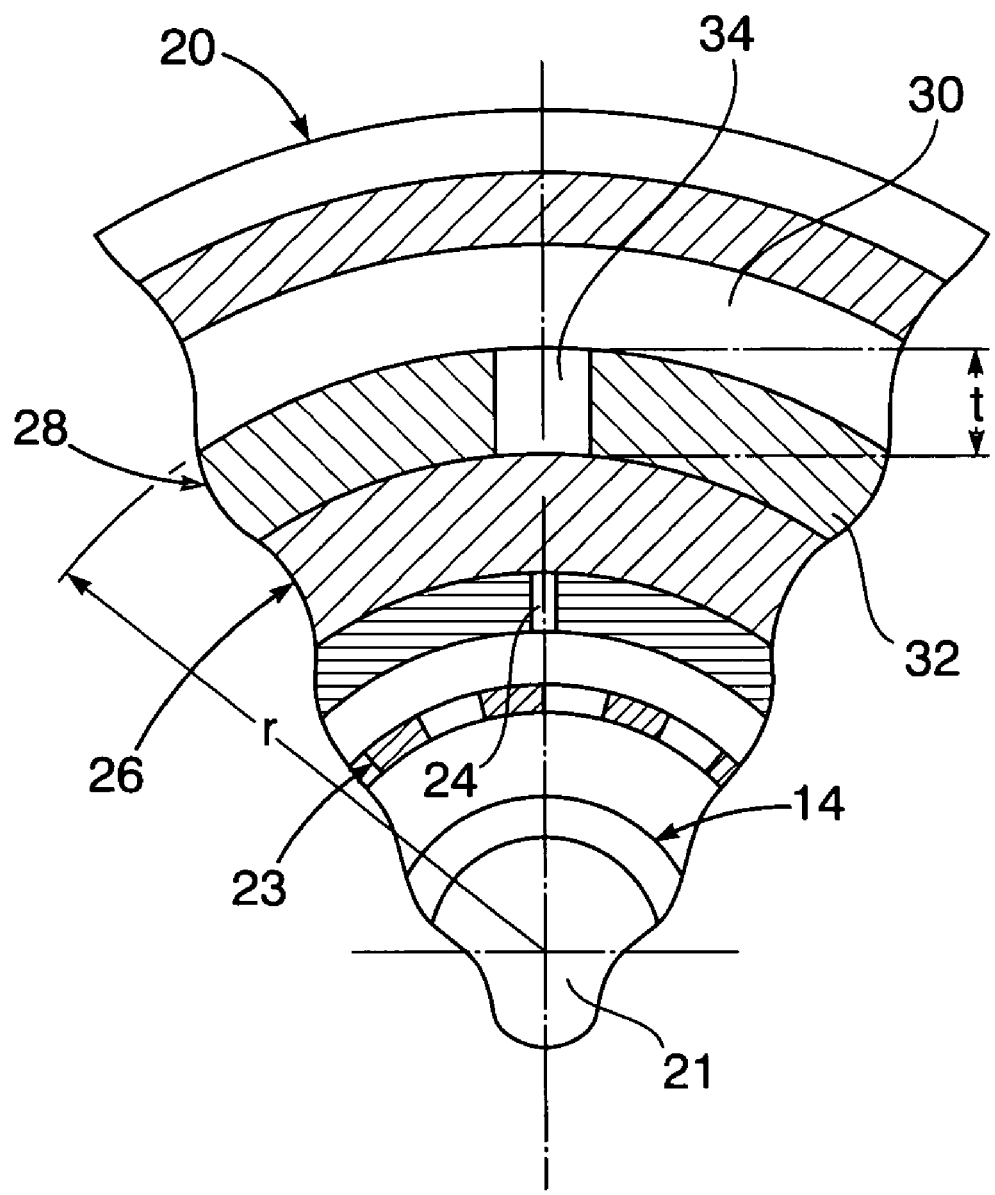
FIG. 5 is a partial section view taken substantially through a plane indicated by section line 5-5 in FIG. 3.

As shown in FIGS. 2, 3 and 4, the support drum 28 is an assembly of five axial sections 32 of different axial lengths $l_1$, $l_2$, $l_3$, $l_4$ and $l_5$ as denoted in FIG. 3. Each of such drum sections 32 as shown in FIG. 5 has slanted holes 34 formed therein for exposure of the rubber layer 26 to the gas in the cavities 30 respectively confined to each of the differently sized drum sections 32, separated from each other by connector plates 36 interconnecting the drum sections 32 to each other. The cylindrical drum sections 32 are also of different radial dimensions (r) as denoted in FIG. 5 and shown in FIG. 3. Furthermore, each of the drum sections 32 has a different thickness (t) as denoted in FIG. 5 corresponding to its radius (r) to thereby determine the different corresponding volumes of the gas cavities 30 respectively associated with the different drum sections 32.

As hereinbefore described, the rubber layer 26 on the cylindrical drum 22 backed by the gas cavities 30 establishes effective acoustic compliance to filter out selected acoustic frequencies dependent on the corresponding dimensions of the different sections of the drum 28, the holes 34 therein and that of the rubber layer 26 excited by acoustic waves traveling with the liquid through the flow chamber 21 of the filter 10. As a result, acoustic energy is reflected back toward its source as in the case of a Helmholtz resonator. By selection of the sizes of the holes 24 in the drum 22 and the holes 34 in the drum 28, the thicknesses of the drums 22 and 28 and the rubber layer 26, as well as the number of the holes 24 and 34, a desired set of acoustic frequencies may be filtered out. Performance is also improved by use of a plurality of the volumetrically small separated gas cavities 30 so that resonant frequency is related to wavelength and size of the gas cavities 30.

In the event the rubber layer 26 is ruptured, the screen 23 is provided so as to prevent rubber pieces of the ruptured layer 26 from being ingested downstream of the filter 10 and avoid valve clogging. A wide range of different frequencies may be filtered to accommodate a variety of installations with or without use of the screen and with all components packaged within the single filter 10. Without the screen 23, maintenance of the filter 10 is simplified by slanting of the holes 24 in the drum 22 and the holes 34 in the drum 28 away from flow direction in the chamber 21 as shown in FIG. 5, so as to minimize collection of particles and silt therein and effect cleansing of the holes 24 and 34 by pressurizing the gas cavities 30 causing expansion of the rubber layer 26 to push the particles or silt out through the holes 24 and 34 so as to be washed away by the flow of the liquid through the chamber 21.

Obviously, other modifications and variations of the present invention may be possible in light of the foregoing teachings. It is therefore to be understood that within the scope of the appended claims the invention may be practiced otherwise than as specifically described.

What is claimed is:

1. A filter for reactive reflection of acoustical energy within a fluid conducted through a piping system, comprising:
   an outer casing enclosing a flow chamber between opposite axial ends thereof through which the fluid is conducted;
   an inner cylindrical support drum positioned within the outer casing and surrounding the flow chamber configured to allow undiverted fluid flow in an axial direction through the flow chamber;
   a plurality of axial sections positioned within the outer casing and surrounding the inner cylindrical support drum, wherein:
      each axial section is associated with a hole in the inner cylindrical support drum,
      each axial section is separated from an adjacent axial section by a connector plate,
      each axial section has a length that differs from a length of each of the other axial sections, and
   wherein each axial section further comprises:
      flexible means positioned within the outer casing and surrounding the inner cylindrical support drum for exposure to the fluid within the flow chamber through the hole in the inner cylindrical support drum associated with the axial section, wherein the flexible means covers the hole to form a barrier that prevents fluid from flowing through the hole; and
      gas cavity means enclosed within the outer casing through which the flexible means is exposed to pressurized gas in opposition to said exposure to the fluid in the flow chamber.

2. The filter as defined in claim 1, wherein said flexible means further comprises a cylindrical rubber layer; and wherein said hole in the inner cylindrical support drum associated with the axial section comprises a slanted hole on which the rubber layer is positioned under said exposure to the fluid within the flow chamber through the slanted hole.

3. The filter as defined in claim 2, wherein a rubber layer associated with one axial section has a thickness that differs from a thickness of each of the other rubber layers associated with each of the other axial sections.

4. The filter as defined in claim 1, wherein each axial section has a radial dimension that differs from a radial dimension of each of the other axial sections.

5. The filter as defined in claim 4, wherein each gas cavity means has a volume that differs from a volume of each of the other gas cavity means.

6. The filter as defined in claim 1, wherein each gas cavity means includes a selectively controlled valve means for equalizing a pressure in the gas cavity means with a pressure of the fluid in the flow chamber.

7. The filter as defined in claim 1, wherein each axial section further comprises an outer cylindrical support drum positioned within the outer casing and surrounding the flexible means at a location opposite the inner cylindrical support drum.

8. The filter as defined in claim 7 wherein at least a portion of the flexible means is exposed to pressurized gas through a hole in the outer cylindrical drum associated with the axial section.

9. The filter as defined in claim 1 wherein the flexible means is affixed to the inner cylindrical support drum.

10. The filter as defined in claim 9 wherein a hole associated with an axial section has a radial dimension that differs from a radial dimension of each of the other holes associated with each of the other axial sections.

11. The filter as defined in claim 9 wherein each axial section further comprises an outer cylindrical support drum section positioned within the outer casing and surrounding the flexible means at a location opposite the inner cylindrical support drum.

12. The filter as defined in claim 11 wherein each axial section is associated with a hole in an outer cylindrical support drum section.

13. The filter as defined in claim 12 wherein a hole associated with an outer cylindrical support drum section has a radial dimension that differs from a radial dimension of each of the other holes associated with each of the other outer cylindrical support drum sections.

14. The filter as defined in claim 13 wherein a hole associated with an outer cylindrical support drum section is aligned with a hole associated with the inner cylindrical support drum.

15. The filter as defined in claim 13 wherein the flexible means is affixed to the inner cylindrical support drum by compression between the inner cylindrical support drum and an outer cylindrical support drum section.

16. The filter as defined in claim 14 wherein a radial dimension of the hole associated with the outer cylindrical support drum section differs from a radial dimension of the hole associated with the inner cylindrical support drum.

* * * * *